United States Patent
Kang et al.

(10) Patent No.: US 7,836,155 B2
(45) Date of Patent: Nov. 16, 2010

(54) METHOD AND SYSTEM FOR ADDRESS ASSIGNMENT IN MOBILE AD-HOC NETWORK

(75) Inventors: Kyung-lim Kang, Suwon-si (KR); Young-sung Roh, Icheon-si (KR); Jae-hoon Kim, Seoul (KR); Young-gon Choi, Suwon-si (KR); Jung-ho Kim, Suwon-si (KR); Shubhranshu Singh, Yongin-si (KR); Jae-pil You, Seoul (KR); Dong-keun Lee, Seoul (KR); Hyun-sik Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 11/335,594

(22) Filed: Jan. 20, 2006

(65) Prior Publication Data

US 2006/0171387 A1    Aug. 3, 2006

(30) Foreign Application Priority Data

Jan. 28, 2005    (KR) ...................... 10-2005-0007941

(51) Int. Cl.
G06F 15/177  (2006.01)
H04L 12/56  (2006.01)

(52) U.S. Cl. ...................... 709/220; 713/175; 709/226; 370/389; 370/401

(58) Field of Classification Search ................ 709/220, 709/226; 370/389, 401
See application file for complete search history.

(56) References Cited

U.S. PATENT DOCUMENTS 7,200,649 B1 * 4/2007 Batke et al. ................. 709/222
2003/0026230 A1 * 2/2003 Ibanez et al. ................. 370/338
2003/0093542 A1 * 5/2003 Saito et al. ................... 709/230
2003/0200437 A1 * 10/2003 Oishi .......................... 713/175
2004/0111494 A1 * 6/2004 Kostic et al. ................. 709/220
2004/0215827 A1 * 10/2004 Preguica et al. ............. 709/245
2005/0083859 A1 * 4/2005 Kang .......................... 370/254

(Continued)

OTHER PUBLICATIONS

Conta, ICMPv6 for the IPv6 Specification, Dec. 1998, IETF, RFC2463, Section 5.5.*

(Continued)

*Primary Examiner*—Ashok B Patel
*Assistant Examiner*—Andrew Goldberg
(74) *Attorney, Agent, or Firm*—Sughrue Mion, PLLC (57) ABSTRACT

A method for assigning a global address to a node in an ad-hoc network is provided. A joining node to the ad-hoc network generates a local address using its MAC address. The joining node inquires of its one-hop nodes about whether they occupy a local address that is the same as the generated local address. When the joining node is informed that there are no nodes occupying the same local address, it generates a global address using the generated local address and a global prefix provided from neighbor nodes. The joining node inquires of an Internet gateway about whether the generated global address is currently used. When the joining node is informed that there are no nodes currently using the same global address, the joining node is assigned the generated global address. Further, the joining node and the Internet gateway communicate messages via a relay node using a tunneling.

16 Claims, 4 Drawing Sheets

U.S. PATENT DOCUMENTS

2006/0092949 A1* 5/2006 Thubert et al. ......... 370/395.52

OTHER PUBLICATIONS

Ryuji Wakikawa, Global connectivity for IPv6 Mobile Ad Hoc Networks, Nov. 3, 2002, IETF, pp. 1-15.*
Charles E. Perkins, IP Address Autoconfiguration for AD Hoc Networks, Nov. 14, 2001, IETF, p. 2.*
Heo SeonMeyong, Address Autoconfiguration in IPv6 1, Jan. 27, 2003, IPv6style, pp. 1-3.*
S. Thomson, IPv6 Stateless Address Autoconfiguration, Dec. 1998, IETF, IBM, RFC 2462, p. 17.*
Park et al., "IPv6 Address Allocation in Hybrid Mobile Ad-Hoc Networks", 2004, IEEE.*
Cha et al., Support of Internet Connectivity for AODV, Feb. 2004, ETRI.*
Jeong et. al., Requirements for Ad Hoc IP Address Autoconfiguration, 2003, IETF.*
Huitema, RFC3750—Unmanaged Networks IPv6 Transition Scenarios, 2004, ISC.*
Zhong Fan, IPv6 Stateless Address Autoconfiguration in Ad Hoc Networks, 2004, IFIP.*

* cited by examiner

FIG. 4

METHOD AND SYSTEM FOR ADDRESS ASSIGNMENT IN MOBILE AD-HOC NETWORK

CROSS-REFERENCE TO RELATED APPLICATIONS

This application claims priority from Korean Patent Application No. 10-2005-0007941 filed on Jan. 28, 2005 in the Korean Intellectual Property Office, the entire disclosure of which is incorporated herein by reference.

BACKGROUND OF THE INVENTION

1. Field of the Invention

Methods and systems consistent with the present invention relate generally to an ad-hoc network. More particularly, the present invention relates to a method for assigning addresses requested by nodes in an ad-hoc network.

2. Description of the Related Art

A typical mobile communication system delivers data between a mobile element and a base station. In such a case, the data is transmitted and received directly between the mobile element and the base station without passing through other nodes. However, an ad-hoc network can take advantage of other nodes for delivering data from a source node to a destination node.

The ad-hoc network is autonomously established by nodes having mobility. Since the nodes are mobile, the structure of the ad-hoc network is highly flexible. The ad-hoc network enables communications between nodes without support provided from an existing mobile communication system, and is not affected by restrictions on the communication distance owing to its support for multihop (i.e., the route between two nodes during communication can consist of more than one hop in that there may be one or more intermediate nodes between the source and destination).

Among the diverse applications of the ad-hoc network, the connection to a server (Internet) will be discussed below. In detail, the discussion is directed to a scheme to access (connect) the ad-hoc network to the server via an Internet gateway (IG).

Figure 1:
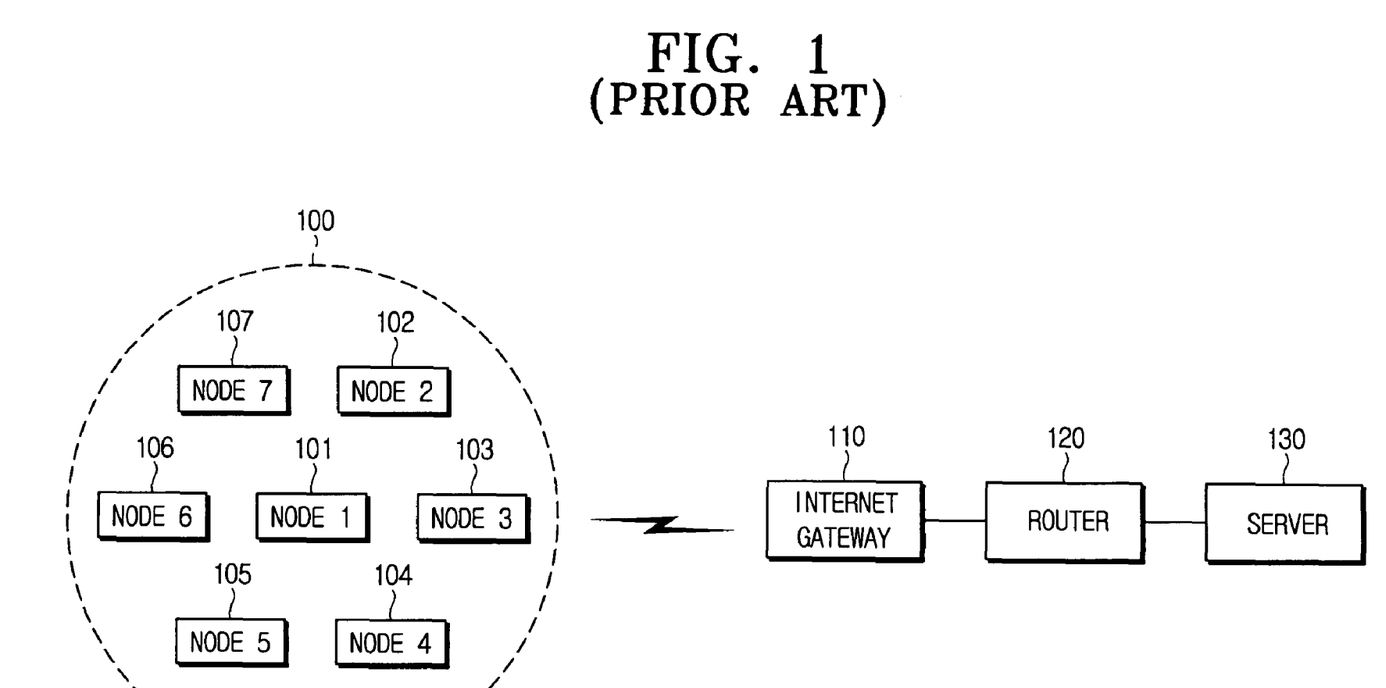
FIG. 1 illustrates a conventional ad-hoc network and Internet which are connected.

FIG. 1 depicts an ad-hoc network, a router, a server, and an Internet gateway in accordance with the related art. The Internet gateway interconnects the ad-hoc network and the router.

The ad-hoc network is constructed with a plurality of nodes. By way of example, the ad-hoc network 100 includes a first node 101, a second node 102, a third node 103, a fourth node 104, a fifth node 105, a sixth node 106 and a seventh node 107, as shown in FIG. 1. The nodes 101, 102, 103, 104, 105, 106 and 107 are wirelessly linked to the Internet gateway 110. The Internet gateway 110 is connected to the server 130 via the router 120. The Internet gateway 110 forwards data originated from a node in ad-hoc network 100 to the server 130 and forwards data originated from the server 130 to a node ad-hoc network 100.

To enable communications with the Internet gateway 110, it is required to assign addresses to the nodes in the ad-hoc network 100, from the Internet gateway 110. In response to an address request from one of the nodes in ad-hoc network 100, the Internet gateway 110 selects one of the available addresses and assigns the selected address to the node that has requested the address assignment. Principally, the address allocated from the Internet gateway 110 is valid only within the ad-hoc network 100. That is, such an allocated address is a local address. It is assumed that an identical local address is used in at least two ad-hoc networks. In the case when at least two nodes are assigned the identical local address communicate with the server, the server is not able to discriminate between the at least two nodes.

To overcome the above disadvantages, each node is assigned a global address for communicating with a foreign network, in addition to the local address that is used within the ad-hoc network. Therefore, a novel method is needed to efficiently assign global addresses to nodes so that such addresses do not overlap.

SUMMARY OF THE INVENTION

Exemplary embodiments of the present invention have been provided to address the above-mentioned disadvantages and other problems and disadvantages not described above, which occur in the conventional arrangement. Also, the present invention is not required to overcome the disadvantages described above, and an exemplary embodiment of the present invention may not overcome any of the problems described above.

An aspect of the present invention provides a method for assigning global addresses to nodes in an ad-hoc network.

Another aspect of the present invention provides a method for assigning a minimum number of global addresses to nodes in an ad-hoc network such that the assigned global addresses do not overlap.

Yet another aspect of the present invention provides a method for reusing an assigned global address when a mobile node leaves an ad-hoc network.

According to an aspect of the present invention, there is provided a method for assigning a global address to a node in an ad-hoc network including a plurality of nodes, which includes selecting one of the neighbor nodes that are assigned global addresses; instructing the selected node to request assignment of a generated global address to an Internet gateway using a tunneling; and leaning from the selected node whether the global address is assignable or not.

According to an aspect of the present invention, there is provided a method for assigning, from an Internet gateway, a global address requested from a node in an ad-hoc network which includes a plurality of nodes, includes discovering a node which is assigned a same global address as the global address requested using a tunneling; and inquiring of the node assigned the global address about whether the node currently uses the assigned global address when the node is assigned the same global address as the requested global address.

According to an aspect of the present invention, there is provided a system for assigning a global address in an ad-hoc network includes a joining node, which selects one of the neighbor nodes assigned global addresses, and sends to the selected relay node a message that requests assignment of the generated global address; a relay node which forwards the message received from the joining node to an Internet gateway using a tunneling, and forwards a message originated from the Internet gateway to the joining node using the tunneling; and an Internet gateway which, when there is a node assigned a same global address as the requested global address, inquires of the node about whether the node currently uses the assigned global address.

BRIEF DESCRIPTION OF THE DRAWINGS

These and/or other aspects of the present invention will become more apparent and more readily appreciated from the following description of exemplary embodiments thereof, with reference to the accompanying drawings, in which.

DETAILED DESCRIPTION OF THE EXEMPLARY EMBODIMENTS OF THE PRESENT INVENTION

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

Descriptions are provided regarding a method for assigning global addresses to nodes in an ad-hoc network, such that the assigned global addresses do not overlap, according to an exemplary embodiment of the present invention, in reference to the attached drawings.

Figure 2:
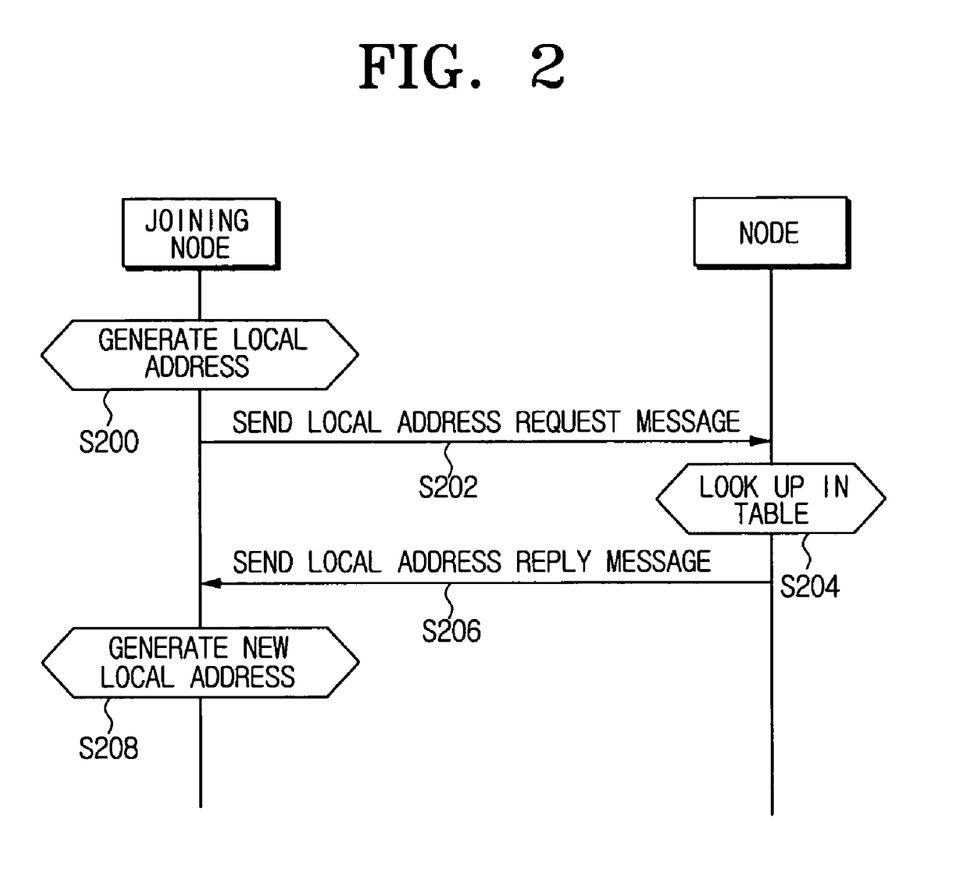
FIG. 2 illustrates the assignment of a local address to a node that is joining an ad-hoc network according to an exemplary embodiment of the present invention.

FIG. 2 illustrates how a node joining to an ad-hoc network is assigned a local address according to an exemplary embodiment of the present invention, which is explained in detail. The joining node generates its local address in operation (S200). Typically, the local address is 64 bits in length. More particularly, the 64-bit local address is extended from a 48-bit media access control (MAC) address of the joining node according to Extended Unique Identifier 64 (EUI-64).

The joining node sends a local address request message, which contains information relating to the generated local address, to a one-hop node in operation (S202). That is, there are no intermediate nodes between the joining node (i.e., the source) and the one-hop node (i.e., the destination).

Note that the node in FIG. 2 is a one-hop node distanced from the joining node in the ad-hoc network. The local address request message inquires about whether other nodes currently use the local address of the joining node.

The node searches in its stored neighbor table and checks whether the neighbor table includes information relating to a same local address as the local address of the joining node in operation (S204). Table 1 shows an exemplary neighbor table, which is stored in the node.

TABLE 1

| Node | Local address |
|---|---|
| Node 1 | xxx. xxx |
| Node 2 | xxx. xyy |
| ... | ... |
| Node 7 | xxx. yyy |

Neighbors of the node are node 1 through node 7. The node stores in the neighbor table information relating to local addresses of the neighbor nodes 1 through node 7. If the local address generated by the joining node is xxx.yyy, the node learns that the node 7 currently uses the local address of the joining node. If the local address of the joining node is xxx.xxy, the node learns that none of the nodes 1 through node 7 currently use the local address of the joining node.

The node sends a local address reply message in operation (S206). The local address reply message may include a message indicating the disallowance of the generated local address.

The joining node, upon receiving a local address disallowance message, generates a new local address based on its MAC address in operation (S208). Likewise, the joining node sends a local address request message, which contains information as to the new local address, to its one-hop nodes.

As illustrated in FIG. 2, the node sends the local address reply message. It is to be appreciated that the joining node uses the generated local address when no local address reply message is received from the node after a preset time period elapses after sending the local address request message. In addition, when the generated local address is currently assigned to another node, the one-hop node may transmit to the address assigned node a message comprising an inquiry regarding whether the address assigned node currently uses the assigned local address. If the one-hop node does not receive a reply from the address assigned node in response to the message, the generated local address may be reassigned to the joining node. Alternatively, the reassigning of the generated local address to the joining node may be performed when the one-hope node receives a reply indicating that the address assigned node does not currently use the assigned local address in response to the message.

Figure 3:
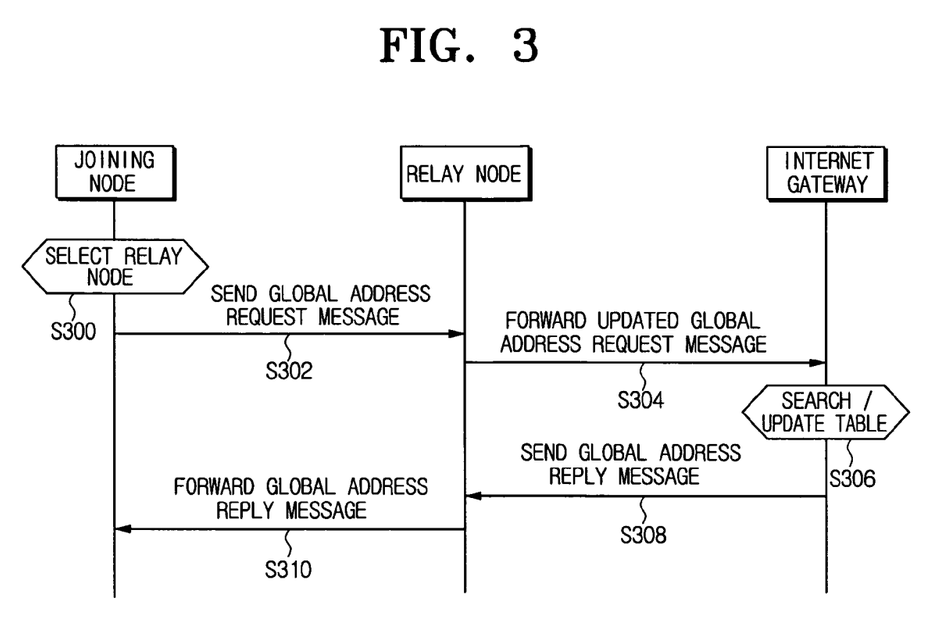
FIG. 3 illustrates the assignment of a global address to a node that is joining an ad-hoc network according to an exemplary embodiment of the present invention.

FIG. 3 illustrates how the joining node is assigned a global address by tunneling, according to an exemplary embodiment of the present invention. The joining node generates a global address using the assigned local address, as explained with respect to FIG. 2, and a global prefix contained in an advertisement message that is received from a neighbor node.

A node in the ad-hoc network broadcasts an advertisement message to neighbor nodes at regular intervals. The advertisement message contains an address of the Internet gateway and the prefix of the ad-hoc network. The global prefix is an identifier, which discriminates networks from each other. The node in the ad-hoc network can obtain information regarding its neighbor nodes from the transmitted and received advertisement messages. Thus, the node can build or update its neighbor table based on such obtained information.

The joining node generates the 128-bit global address consisting of the 64-bit global prefix and the 64-bit local address. It is noted that the length of the global address is variable according to a preference of a user.

The joining node selects a relay node in operation (S300). The joining node detects its neighbor nodes by receiving advertisement messages from its neighbor nodes. The joining node selects one of the detected nodes as the relay node for communicating with the Internet gateway.

The joining node sends to the relay node a global address request message, which contains information relating to the generated global address and information indicating that duplicate address detection (DAD) is adopted using the tunneling between the Internet gateway and the relay node in operation (S302). The global address request message inquires about whether the generated global address is available. The source address of the global address request message is the local address of the joining node, its destination address is an Internet Protocol version 6 (IPv6) solicited-node multicast address. The relay node updates the received global address request message and forwards the updated message to the Internet gateway in operation (S304). At this time, the source address of the updated global address request message is the global address of the relay node, and the destination address is the address of the Internet gateway.

The Internet gateway checks whether its stored global address table includes information relating to the same global address as the generated global address, and updates the global address table, if necessary, in operation (S306). Table 2 shows an example of the global address table stored in the Internet gateway.

TABLE 2

| Node | Global address | Lifetime |
| --- | --- | --- |
| Node 1 | xxx. xxx. xxx | α |
| Node 2 | xxx. xxx. xyy | β |
| ... | ... | ... |
| Node 7 | xxx. xxx. yyy | δ |
| Node 8 | xxy. Yyy. xxy | β |
| Node 9 | xxy. Yyy. xxx | α |
| ... | ... | ... |
| Node n | yyy. Xxx. xyy | α |

In Table 2, the Internet gateway stores in its global address table information regarding global addresses assigned to a first node through an $N^{th}$ node and their respective lifetimes.

The Internet gateway sends to the relay node a global address reply message containing information that indicates that the DAD is adopted using the tunneling between the Internet gateway and the relay node in operation (S308). The source address of the global address reply message is the address of the Internet gateway, and its destination address is the global address of the relay node. The global address reply message includes a global address disallowance message, which denotes that the global address generated by the joining node is unallowable.

When the relay node receives a global address reply message, which indicates for example a duplicate address, the relay node forwards the global address reply message received from the Internet gateway in operation (S310). The source address of the forwarded global address reply message is the local address of the relay node, and its destination address is the local address of the joining node. The joining node periodically broadcasts its generated advertisement message to neighbor nodes. When a local address disallowance message is received, the joining node generates a new global address. As noted above, the joining node sends to the relay node a global address request message containing information regarding the new global address.

As illustrated in FIG. 3, the relay node forwards the global address reply message. It is understood that, when the joining node sends the global address request message, and then no global address reply message is received after a preset time period, then the joining node uses the generated global address.

Figure 4:
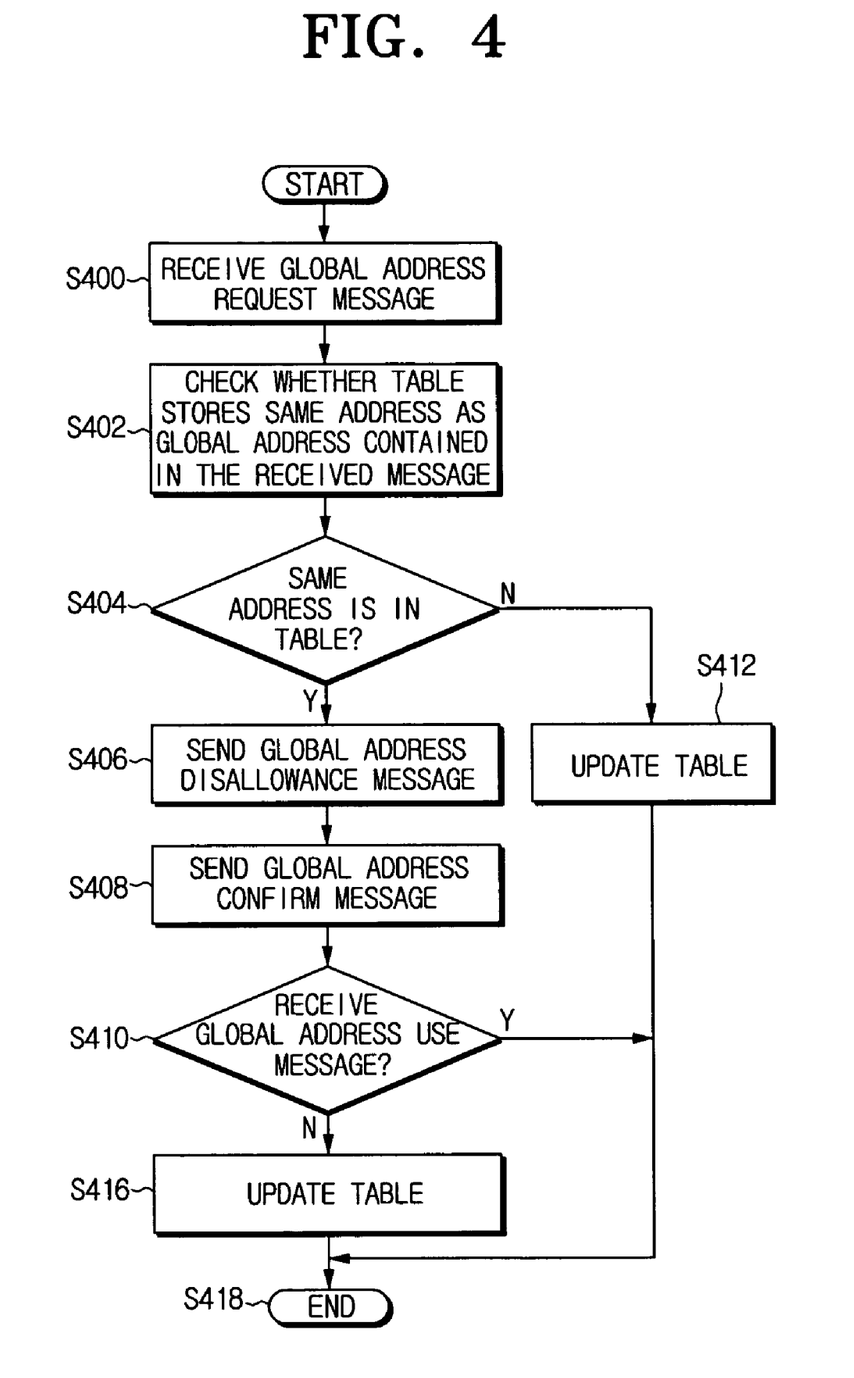
FIG. 4 is a flowchart outlining an operation of an Internet gateway according to an exemplary embodiment of the present invention.

FIG. 4 is a flowchart outlining an operation of an Internet gateway according to an exemplary embodiment of the present invention, which is described below.

The Internet gateway receives a global address request message in operation (S400). The Internet gateway checks whether the global address table stores a same address as the global address that is contained in the received global address request message in operation (S402).

The Internet gateway determines whether the global address table includes the same global address that is contained in the global address request message in operation (S404). When the same global address is present in the global address table as the global address that is contained in the global address request message, the Internet gateway proceeds to operation (S406). Otherwise, when the same global address is absent, the Internet gateway proceeds to operation (S412).

The Internet gateway sends a global address disallowance message to the relay node that has forwarded the global address request message in operation (S406). The Internet gateway sends a global address confirm message to a node that currently uses the global address generated by the joining node in operation (S408). As shown in Table 2, the Internet gateway stores the lifetime of respective global addresses, which is the valid time duration of the global addresses that are assigned to the respective nodes. Yet, a node that is currently using an assigned global address may leave the ad-hoc network before the expiration of the respective lifetime. In this situation, disadvantageously, the Internet gateway stores the unused global address and cannot reuse this same global address. In this regard, the Internet gateway sends a global address confirm message and, thus, inquires of a relevant node (a node that is assigned the global address that is contained in the global address request message) about whether the assigned global address is currently used.

The Internet gateway determines whether a global address use message is received or not in operation (S410). When the global address use message is received, the Internet gateway jumps to operation (S418), where operation ends. When the global address use message is not received, the Internet gateway proceeds to operation (S416). The Internet gateway, upon the reception of the global address use message, can learn whether the node that is assigned the global address currently uses that address.

The Internet gateway updates its global address table in operation (S416). In particular, the Internet gateway eliminates the leaving node, the global address of the leaving node, and the respective lifetime, from the global address table. Since the global address has been dropped, the same global address can be reused.

The Internet gateway also updates its global address table in operation (S412). Specifically, the Internet gateway records in the global address table the joining node, the global address generated by the joining node, and the respective lifetime of the generated global address.

The node, which currently uses an assigned global address, may send a refresh message, before the respective lifetime of the assigned global address expires, to request the reuse of the assigned global address. The Internet gateway that receives such a refresh message then extends the lifetime of the assigned global address.

As set forth above, the number of delivered messages can be reduced since the joining node to the ad-hoc network checks whether its one-hop neighbor nodes occupy a same local address. A node intending to join the ad-hoc network can shorten the time required for the assignment of the global address by adopting the tunneling for the sake of the global address assignment.

If a node occupies the global address requested by the joining node, the Internet gateway checks whether the node currently uses the global address or not. Therefore, the efficient management of the global addresses can be realized.

While the present invention has been particularly shown and described with reference to exemplary embodiments thereof, it will be understood by those skilled in the art that various changes in form and details may be made to the exemplary embodiments without departing from the spirit and scope of the invention as defined by the appended claims.

What is claimed is:

1. A method for assigning a global address to a node in an ad-hoc network including a plurality of nodes, the method comprising:

generating, at the node, a global address using a local address of the node and a global prefix discriminating each of a plurality of networks;

selecting, at the node, one of neighbor nodes as a relay node;

instructing, at the node, the selected neighbor node to request, from an Internet gateway, assignment of a generated global address to the node, by using tunneling; and receiving, at the node, information, from the selected neighbor node, regarding whether the generated global address is assignable, wherein the local address of the node is allocated to the node according to result of searching whether the same local address is used in a neighbor table stored in a neighbor node, the neighbor table storing local addresses of neighbor nodes, wherein the information comprises a global address message indicating allowability of the generated global address, and the information is transmitted from the Internet gateway according to result of comparison of the global address with a pre-stored global address table in the Internet gateway, wherein the method further comprises:

if the generated global address is currently assigned to another node, transmitting a message to the another node, wherein the transmitted message comprises an inquiry regarding whether the another node currently uses the assigned global address;

if no reply is received in response to the transmitted message, reassigning the generated global address to the node; and if a reply is received in response to the transmitted message and the reply indicates that the another node does not currently use the assigned global address, reassigning the generated global address to the node.

2. The method of claim 1, further comprising inquiring of a one-hop node whether the generated local address is currently used, and wherein the generated local address is assigned when no reply is received from the one-hop node.

3. A method for assigning a global address that is requested by a first node in an ad-hoc network, which includes a plurality of nodes, the method being performed by an Internet gateway, the method comprising:

receiving a global address request message transmitted from the first node via a relay node;

checking whether a global address that is allocated to a second node is identical to the requested global address or not, using a global address table stored in the Internet gateway;

if the second node is present in the global address table, sending a global address disallowance message to the relay node that has forwarded the global address request message by using tunneling, and otherwise, updating the global address table;

if the second node is present in the global address table, sending the second node a message for inquiring whether the second node currently uses the allocated global address;

if a global address use message is received from the second node that currently uses the allocated global address, maintaining the global address table, and if a global address use message is not received, updating the global address table and reassigning the allocated global address to the first node; and if a reply is received in response to the message for inquiring and the reply indicates that the second node does not currently use the allocated global address, reassigning the allocated global address to the first node.

4. The method of claim 3, further comprising discarding information relating to the allocated global address when no reply is received from the second node.

5. A system for assigning a global address in an ad-hoc network, the system comprising:

a joining node which generates a global address using a local address of the joining node and a global prefix discriminating each of networks;

a relay node, which is a neighbor node with respect to the joining node and stores a neighbor table that includes local addresses of neighbor nodes of the relay node; and an Internet gateway;

wherein the relay node checks whether the neighbor table includes information relating to the same local address as the local address of the joining node, wherein the joining node sends to the relay node a first message that requests assignment of a generated global address;

wherein the relay node forwards the first message that is received from the joining node to the Internet gateway using tunneling and forwards a second message that is originated by the Internet gateway to the joining node using tunneling; and wherein the Internet gateway checks whether there is a conflicting node assigned the same global address as the requested global address based on a pre-stored global address table in the Internet gateway, transmits to the conflicting node a third message for inquiring whether the conflicting node currently uses the global address that is assigned to the conflicting node if there is the conflicting node assigned the same global address as the requested global address, updates the global address table and reassigns the generated global address to the joining node if no reply is received in response to the third message, and reassigns the generated global address to the joining node if a reply is received in response to the third message and the reply indicates that the conflicting node does not currently use the assigned global address.

6. The system of claim 5, wherein the Internet gateway assigns the requested global address to the joining node when there is no other node that is assigned a global address that is identical to the requested global address.

7. The system of claim 5, wherein the relay node sends an advertisement message that contains an address of the Internet gateway and a global prefix, at regular time intervals.

8. The system of claim 5, wherein the joining node inquires of a one-hop node about whether a generated local address is currently used, and wherein the joining node is assigned the generated local address when no reply is received from the one-hop node.

9. The system of claim 5, wherein the Internet gateway discards information relating to the previously assigned global address when no reply is received from the conflicting node.

10. A method for assigning a global address to a node in an ad-hoc network, the method comprising:

generating a global address at a first node using a local address of the first node and a global prefix, wherein the first node is to be joined to the ad-hoc network;

transmitting a first message from the first node to a neighbor node, wherein the first message comprises an inquiry regarding whether the generated global address is currently assigned to another node;

transmitting the first message from the neighbor node to an Internet gateway using tunneling to request assignment of the generated global address to the first node; and assigning the generated global address to the first node according to a global address message indicating allowability of the generated global address, wherein the local address of the first node is generated in the first node and whether the generated local address is usable is checked based on a neighbor table stored in a neighbor node, the neighbor table storing local addresses of neighbor nodes, wherein the global address message is transmitted from the Internet gateway to the first node according to result of comparison of the generated global address with a pre-stored global address table in the Internet gateway, wherein the method further comprises:

if the generated global address is currently assigned to another node, transmitting a fourth message to the another node, wherein the fourth message comprises an inquiry regarding whether the another node currently uses the assigned global address;

if no reply is received in response to the fourth message, reassigning the generated global address to the first node; and if a reply is received in response to the fourth message and the reply indicates that the another node does not currently use the assigned global address, reassigning the generated global address to the first node.

11. The method according to claim 10, wherein the generated global address is generated by:

generating a local address at the first node;

transmitting a second message from the first node to a second node, wherein the second message comprises an inquiry regarding whether the generated local address is currently assigned to another node;

if the generated local address is not currently assigned to another node, generating the global address at the first node using the generated local address.

12. The method according to claim 11, wherein the local address is generated using a media access control (MAC) address of the first node that is to be joined.

13. The method according to claim 11, wherein the global address is generated using a global prefix that is provided from a neighbor node.

14. The method according to claim 11, further comprising, when the generated local address is currently assigned to another node, transmitting a third message to the other node, wherein the third message comprises an inquiry regarding whether the other node currently uses the assigned local address.

15. The method according to claim 14, further comprising, if no reply is received in response to the third message, reassigning the generated local address to the first node.

16. The method according to claim 14, further comprising, if a reply is received in response to the third message, and the reply indicates that the other node does not currently use the assigned local address, reassigning the generated local address to the first node.

* * * * *